United States Patent [19]
Natens

[11] 3,809,911
[45] May 7, 1974

[54] METHOD OF MEASURING OPTICAL DENSITY

[75] Inventor: Luc Yves Natens, Berchem, Belgium

[73] Assignee: Agfa-Gevaert N.V., Mortsel, Belgium

[22] Filed: May 1, 1973

[21] Appl. No.: 356,067

Related U.S. Application Data

[63] Continuation of Ser. No. 174,469, Aug. 24, 1971, abandoned.

[52] U.S. Cl. ............... 250/571, 250/216, 356/202
[51] Int. Cl. .......................................... G01n 21/06
[58] Field of Search ... 250/219 FR, 219 S, 219 WE; 356/199, 200, 201, 202, 238

[56] References Cited
UNITED STATES PATENTS

| | | |
|---|---|---|
| 3,456,116 | 7/1969 | Gunn-Russell............ 250/219 WE |
| 2,769,374 | 11/1956 | Sick.............................. 250/221 |
| 3,360,654 | 12/1967 | Muller.......................... 250/221 |
| 3,377,484 | 4/1968 | Hilferink.................... 250/219 S |

*Primary Examiner*—Walter Stolwein
*Attorney, Agent, or Firm*—William J. Daniel

[57] ABSTRACT

A photoelectric device for measuring variations in the optical density of a moving web. The device comprises a lamp at one side of the web path, a photoelectric detector at the other side of the web path, and a screen between the web and the detector which intercepts part of the radiation transmitted by the web to the detector.

The device is largely insensitive to vibrations of the web.

3 Claims, 4 Drawing Figures

METHOD OF MEASURING OPTICAL DENSITY

This is a continuation, of Ser. No. 174,469, filed Aug. 24, 1971, now abandoned.

The present invention relates to a photoelectric device for measuring or determining variations in the optical density of a moving web.

When a web is transported by, e.g., a number of rollers, the web tends to vibrate. These vibrations do not seriously disturb measurement of the density of a web of specular, i.e., non-scattering material, but as the vibrations involve changes in the distance between the web and a detector used for detecting radiation modulated by the web, the vibrations do disturb measurement of the density of a web of radiation-diffusing material.

It is an object of the invention to provide a photoelectrical device for measuring the density of a moving web of radiation-diffusing material, wherein the energy impinging on the detector is not materially affected by vibrations of the web.

It is a further object of the invention to provide a said device suitable for measuring the density both of radiation-diffusing materials and of specular materials.

A photoelectric device for measuring or determining variations in the optical density of a moving web; comprising:

a. a radiant energy source, b. a detector with a photosensitive surface mounted in such a way that the photosensitive surface receives radiant energy which has been emitted by said source and which has been modulated by the web material, and c. a radiant energy absorbing screen which is arranged to intercept some of the modulated radiation which would otherwise reach said detector, the distance between the true guide plane of the web and the detector, the distance between the screen and the detector and the dimensions of the screen and detector being such that the variations in the distance between the web and detector which occur by reason of vibration of the web have substantially no effect on the amount of modulated radiation incident on the said detector surface.

The actual distance between the detector and the true guide plane of the web may be such that a graph plotting the energies incident upon the sensitive surface of the detector for different distances of the detector from the web, the said actual distance lies at a position on the graph curve where $(\delta E/\delta 1) \approx 0$ wherein $E$ is the energy incident upon the detector surface and $1$ is the said actual distance.

The degree of accuracy of the density measurement which is required depends on the particular purposes in view in a given use of the device. In general, devices are preferred wherein the energy incident upon the detector surface does not vary by more than 1 percent in consequence of the vibrations of the web.

The device may be designed so as to indicate actual optical density values or signals representing those values, or the device may be designed so as merely to indicate variations in optical density from one position on the web to another or so as to indicate when the optical density does not comply with some predetermined specification, e.g., a specification comprising a minimum and/or a maximum permissible optical density.

Certain embodiments of the invention will be described with reference to the accompanying drawings in which:

FIG. 1 schematically shows a device according to the invention;

Figure 1:
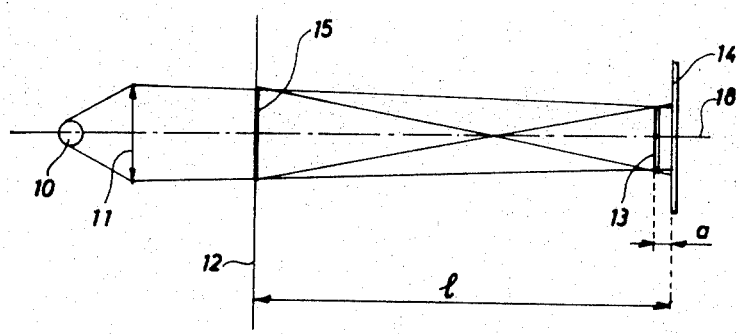

In FIG. 1 a lamp 10 directs, e.g., infra-red light to a lens 11 that directs a beam of substantially parallel light rays to a moving web material such as, e.g., a photographic film 12. If the film 12 diffuses the radiation used, e.g., this diffusion may occur by a light-sensitive silver halide gelatinous layer provided on a transparent triacetate or polyester support, a diffuse radiation spot 15 is produced on the film 12. At the other side of the film 12 there is a photoelectric detector 14, the photosensitive surface of which is at a distance 1 from the spot 15. At a distance $a$ measured from the detector 14 towards the spot 15, a radiation-absorbing screen 13 is arranged. The arrangement is such that the shadow of the screen 13 falls completely on the photoelectric detector 14.

Figure 3:
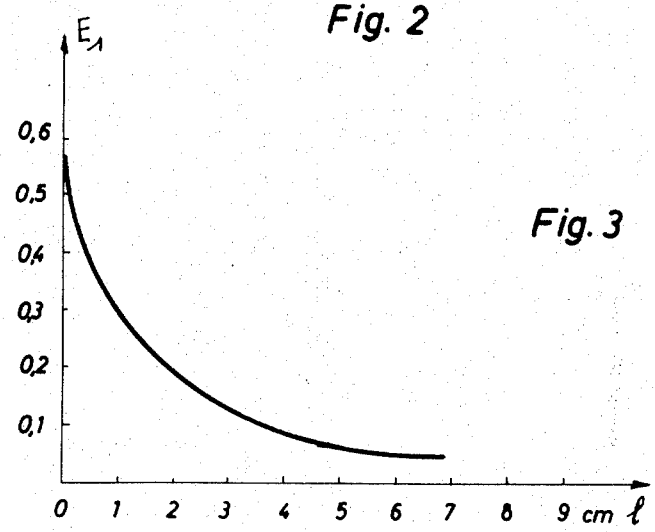
FIG. 3 is a graph of the energy incident upon the photoelectric detector as a function of the distance between the plane of the web and the detector.

The energy impinging on the detector 14 when the screen 13 is removed is a function of the distance 1. In FIG. 3 a graph is shown of the energy $E_1$ impinging on the photoelectric detector as a function of the distance 1. A similar graph can be recorded also for the energy $E_2$ impinging on the screen 13 as a function of the distance $(1 - a)$ from the screen 13 to the film 12.

It will be evident that the energy impinging on the detector 14 when the screen 13 is arranged in front of it, is $(E_1 - E_2)$. If $a$ remains constant, then $E = (E_1 - E_2)$ can be determined graphically as a function of 1 by bringing the co-ordinates of both graphs into register, then shifting the graph of $E_2$ over a length $a$ to the left parallel with the abcissa, and subsequently substracting the ordinates of the graph $E_2$ from these of $E_1$.

The graph of $E$ as a function of 1 obtained in this way may have one or more extremes, i.e., points where the tangent on the curve lies horizontally, the values of the distance corresponding to these points satisfying $(\delta E/\delta 1) = 0$.

It is also possible to use a divergent beam instead of a parallel beam as used in the embodiment according to FIG. 1. As a result of the vibration of the film the spot 15 will become alternatively greater and smaller, but the quantity of energy directed to the film remains almost constant. It is further also possible to record a graph of the energy $E$ impinging on the photoelectric detector for an embodiment using a divergent beam. When the distance 1 is such that the tangent on the curve $E(1)$ is horizontal, then the output of the detector will be almost unaffected by the vibration of the film.

Figure 2:
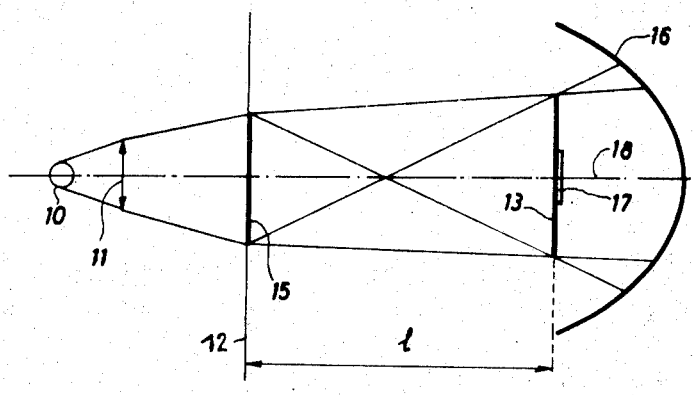
FIG. 2 shows an alternative device according to the invention.

The device according to FIG. 2 is more sensitive. In this device parabolic mirror 16 is mounted behind the photoelectric detector 17, so that the radiant energy is reflected towards the detector 17. At the non-sensitive side of the detector 17 the screen 13 is mounted. Instead of placing the screen against the detector the screen could be mounted at some distance from the detector.

In the embodiment according to FIG. 2 the photoelectric detector 17 is mounted in such a way, that its photosensitive surface lies on the image formation locus of the diffuse light spot 15. Alternatively, the photoelectric detector can be placed so that the image formation locus during vibration of the film partially comes next to the image formation locus of the diffuse light source, so that the energy impinging on the detector varies in a nonlinear way as a function of the distance 1. This extra non-linear phenomenon can in turn manifest itself in, e.g., a second extreme in the curve $E(1)$. If care is taken that the two extremes have the same value and are situated next to each other, then it is possible to obtain a fairly flat section in the curve $E(1)$, showing that the impinging energy $E$ in this section is almost independent of the distance 1, i.e., the vibration of the film.

In practice, the output signals of the detector deviate from the theory, described in connection with FIG. 2 because of the variable reflectance and absorptive power of the surface layer of the photoelectric detector as a function of the angle of incidence. Another reason is the non-sharp reproduction of the light spot 15 in the plane of the detector 17 so that only part of the reflected energy is received by the detector 17. A further reason is the one-sided sensitivity of the detector 17 whereby a part of the energy reflected with an angle greater than 90° in relation to the axis 18 of the device, gets lost.

EXAMPLE

Figure 4:
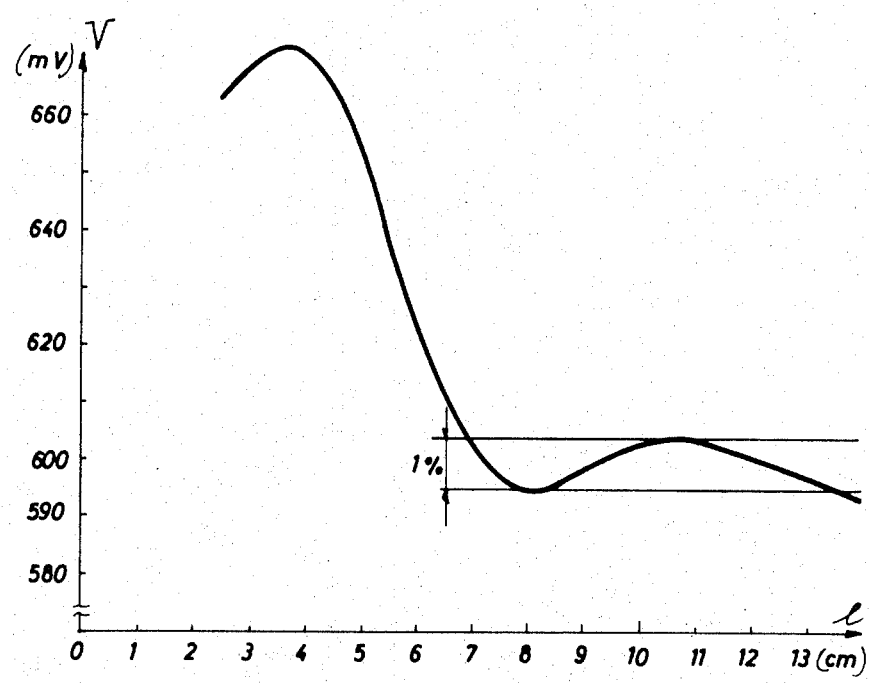
FIG. 4 shows a graph of the output of the detector as a function of the distance between the web and the detector for a device according to FIG. 2.

In FIG. 4 there is shown a graph $V$ versus 1 for a medical radiographic film illuminated by a lamp and lens. The irradiated spot on the film has a diameter of 40 mm. Use is made of a device as shown in FIG. 2 comprising a parabolic mirror 16 and a detector plated with its light-sensitive surface in the focal plane of the mirror. The screen 13 has a diameter of 30 mm. In front of the detector there is mounted a red-transmitting filter. The detector 17 measures 10 by 20 mm.

As appears from the graph of FIG. 4 the output voltage $V$ of the detector 17, expressed in $mV$, varies over 1 percent when 1 varies between 7 cm and 12.7 cm.

We claim:

1. A method of measuring the optical density of a web which is moving along a generally linear path and which partly diffuses radiation passing therethrough so that radiation issuing from the web contains a specular fraction and a diffuse fraction, comprising
   1. projecting a radiation spot of uniform intensity on the web from one side of said web,
   2. arranging a radiation detector generally on the projection axis of said spot on the opposite side of and at a predetermined distance from said web path to receive radiation issuing from said spot and measure thereby the optical density of the web, and 3. placing a screen opaque to said radiation between said web path and said detector at a point on the optical axis between said light spot and said detector, a predetermined distance away from said web path, for intercepting a part of the radiation emitted from the web towards the detector, said predetermined distances being determined in advance by a. repeatedly measuring the amount of radiation received by said detector from a control spot of constant intensity, with said opaque screen located at different points, over a range of distances gradually spaced away from said web path, and
       b. locating said detector and said screen within those portions of said distance ranges where said measured energy values are at a maximum generally constant level and practically free of variation, whereby the radiation detector measurements of said moving web are substantially independent of small displacements of said web from said linear path.

2. The method of claim 1 wherein said detector is smaller than said opaque screen and is placed in close proximity to said opaque screen with its sensitive surface facing away from said film path and said projected spot is reflected to said detector by means of a mirror surface disposed on the opposite side of said opaque screen from said film path.

3. The method of claim 2 wherein said mirror surface is parabolically curved generally symmetrically with the optical path of said projected image.

* * * * *

UNITED STATES PATENT OFFICE
CERTIFICATE OF CORRECTION

Patent No. 3,809,911                     Dated   May 7, 1974

Inventor(s)    Luc Yves NATENS

It is certified that error appears in the above-identified patent and that said Letters Patent are hereby corrected as shown below:

In The Heading of the Patent, insert

-- [30]   Foreign Application Priority Data

Aug. 25, 1970    Great Britain    40884/70 --.

Signed and Sealed this sixteenth Day of March 1976

[SEAL]

Attest:

RUTH C. MASON  
*Attesting Officer*

C. MARSHALL DANN  
*Commissioner of Patents and Trademarks*